Dec. 15, 1953 L. A. DORFF 2,662,974
ARRANGEMENT FOR SINGLE-CHANNEL TIME SHARING
Filed Nov. 19, 1949
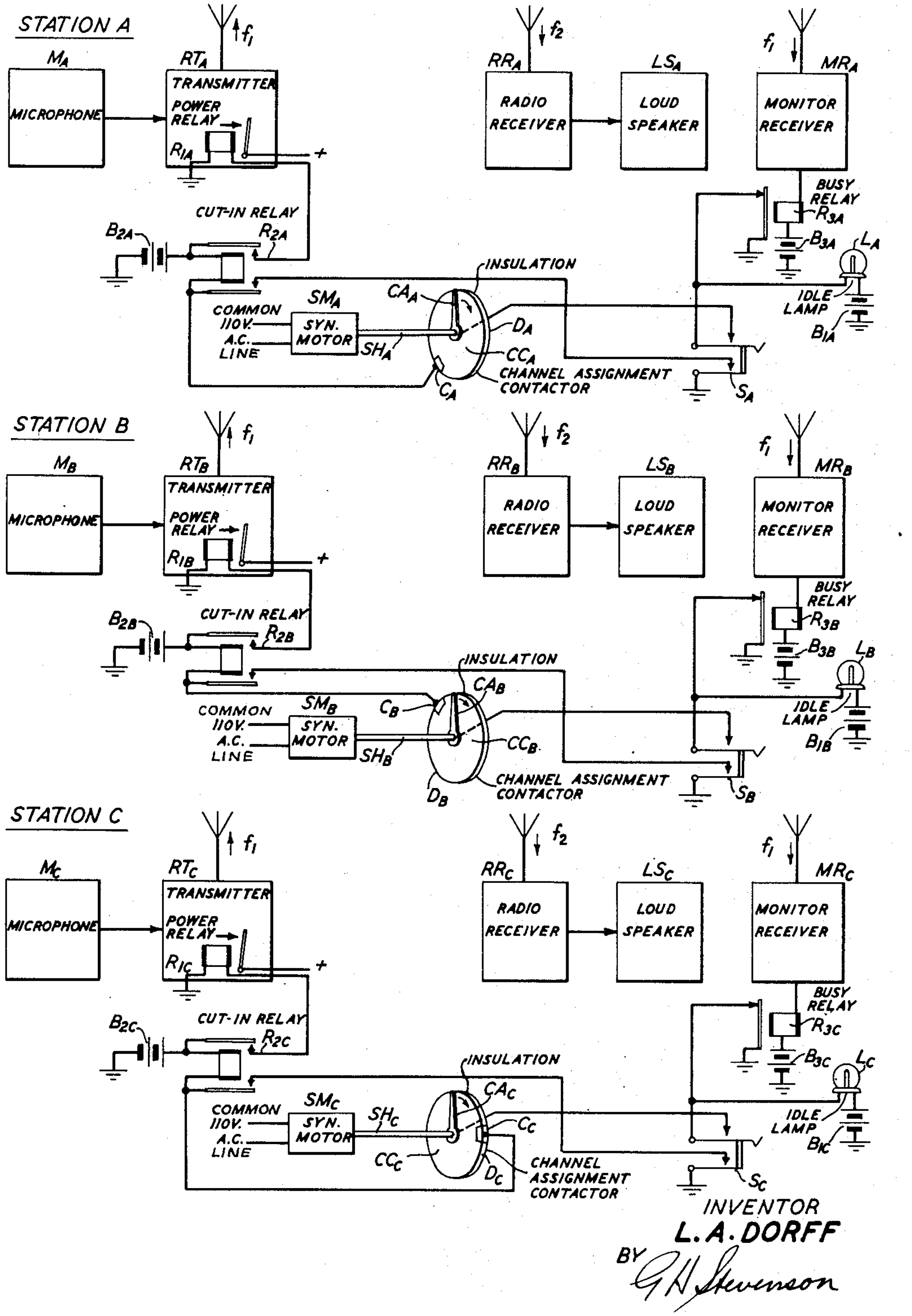
INVENTOR
L. A. DORFF
BY G. H. Stevenson
ATTORNEY Patented Dec. 15, 1953 2,662,974

UNITED STATES PATENT OFFICE 2,662,974

ARRANGEMENT FOR SINGLE-CHANNEL TIME SHARING

Louis A. Dorff, Glen Ridge, N. J., assignor to Bell Telephone Laboratories, Incorporated, New York, N. Y., a corporation of New York Application November 19, 1949, Serial No. 128,309

4 Claims. (Cl. 250—6)

This invention relates to radio signaling systems in which a plurality of transmitters operate on the same frequency. More particularly it relates to arrangements for preventing the simultaneous operation of two or more such transmitters, in order to avoid mutual interference.

An example of the type of signaling system to which the invention is applicable is a radiotelephone dispatch service to taxicabs in which several taxicab companies in the same area are each provided with a radiotelephone system to dispatch their particular cabs, and to which only a single two-frequency radio channel is allocated. In a system of this kind all the fixed or base station transmitters operate on one frequency and all the mobile stations on the other frequency, and if two transmitters on the same frequency are operating at the same time interference is likely to result.

For preventing mutual interference from this cause the arrangement commonly employed is to have the radio operator monitor before attempting a call, to determine if the channel is idle. While this method is slow and not always dependable, especially when competitive interests are involved, there is at present no better procedure available for the mobile stations. For the base stations, however, the present invention affords simple and reliable means for automatically preventing the simultaneous operation of two transmitters.

A feature of the invention is that it provides means for preventing the simultaneous operation of two or more base station transmitters on the same frequency without the use of any interconnecting wire lines to coordinate their operation other than the common power circuit of the area.

Another feature of the invention is a synchronized but differently phased rotating contactor at each base station which prevents the simultaneous closing of the energizing circuits of more than one transmitter.

Another feature is a monitoring receiver at each base station with a circuit controlled by its output which automatically locks out its associated transmitter when another transmitter is operating.

Still another feature of the invention is a device at each base station for indicating whether or not the radio channel is idle.

These and other features will be more clearly understood from the following detailed description when read in connection with the accompanying drawing, which shows an illustrative embodiment of the invention.

Referring to the drawing, the reference letters A, B and C designate three of a plurality of base radio stations operating on the same transmitting frequency $f_1$. The same letters as subscripts will be used in the following description to distinguish the corresponding elements of the respective stations, being omitted, however, when referring to any or all stations, rather than to a particular station. Each station comprises a microphone M, a radio transmitter RT, a radio receiver RR tuned to the frequency $f_2$ of the mobile transmitters of the system, and a loudspeaker LS. At each station a power relay $R_1$ in the transmitter unit RT is connected to a make contact of a cut-in relay $R_2$, which when operated as described hereinafter causes the power relay to operate and apply energizing power to the transmitter. Each station is further provided with a channel assignment contactor CC, an operator's switch S, a channel idle lamp L, and a monitor receiver MR tuned to the base station transmitter frequency $f_1$, the output of which is connected, by relay or other means not shown, to control the operation of the busy relay $R_3$.

The channel assignment contactor CC may comprise an adjustable contact C mounted on the face of a stationary insulating disc D, and a rotating contactor arm CA fixed to shaft SH and driven by a small synchronous motor SM of the clock type. The motors at all stations in the system are connected to a common source of alternating-current power, which may be the public 110-volt alternating-current power line of the area. By means of reduction gearing within the motor the rotational speed of the contactor arm CA may be reduced to the order of one revolution per minute, for example. The contactor arms CA rotate in synchronism and the contacts C are set at different positions on the disc D at each station so that contacts between CA and C are made in some prearranged sequence, with no two contacts occurring simultaneously.

When all the fixed station transmitters are idle the monitor receivers MR receive no carrier and the busy relays $R_3$ are all non-operated. The channel idle lamps L are then lighted from batteries $B_1$, indicating to the respective radio operators that a call can be placed.

Suppose now that the operator at station B wishes to use the radio channel. He observes the idle channel lamp $L_B$ and if it is lighted he operates the assignment switch $S_B$. Since the busy relay $R_{3B}$ is non-operated, a ground connection will be made through its back contact and the upper make contact of the operated switch $S_B$ to the channel assignment contactor arm $CA_B$. As this arm rotates it eventually reaches the contact $C_B$, whereupon the ground connection just mentioned causes the cut-in relay $R_{2B}$ to be operated by battery $B_{2B}$. Operation of this relay causes it to lock up through its lower contact to ground on the lower contact of switch $S_B$, the energizing control circuit being then independent of the rotating contactor and the contact of relay $R_{3B}$. Its operation also causes the operation of the power relay $R_{1B}$, which in turn causes transmitter $RT_B$ to be energized and its carrier wave to be continuously emitted. The energizing power sources for the transmitters RT are omitted from the drawing, for the sake of simplicity and convenience.

Reception of the carrier from transmitter $RT_B$ causes the monitor receivers MR at all base stations to operate the busy relays $R_3$ to the batteries $B_3$, thus extinguishing the idle channel lamps L. The extinction of lamp $L_B$ is a signal to the operator at station B that his transmitter is emitting and that he may proceed with his call. Under these conditions no other station can originate a call since the ground connection to the upper contact of the switches S through the contact of relays $R_3$ is now broken. This prevents a ground connection to any contactor arm CA, and the operation of any cut-in relay $R_2$, should the operator at some other station attempt to make a call.

Since the energizing control circuit of station B is now closed, by virtue of the self-locking action of relay $R_{2B}$, through a path that does not include the contact of relay $R_{3B}$, it can not be held open by the reception through the monitor receiver $MR_B$ of the station's own emitted waves. After it is once closed it is under the control only of the operator's switch $S_B$.

When the operator at station B has completed his call and restores switch $S_B$ to normal, the cut-in relay $R_{2B}$ is released. This opens the energizing circuit of the power relay $R_{1B}$ and removes power from the transmitter. When the carrier of transmitter $RT_B$ ceases to be emitted there is no output from the monitor receivers MR and therefore all busy relays $R_3$ release. In doing so they cause the lamps L of all stations to light, indicating that the channel is again idle and free to be used.

If one or more operators are waiting with their assignment switches S operated, the release of the busy relays $R_3$ will make a ground connection to the contactor arms CA of those stations. Since the arms rotate in synchronism and are differently phased, one arm will reach its contact C before all others and to this station will be assigned the radio channel by the operation and self-locking of its cut-in relay $R_2$, as previously explained. The operation of this station's transmitter will cause the busy relays $R_3$ in all stations to operate, thereby removing the ground connection from their contactor arms CA and so preventing the operation of any other cut-in relay $R_2$ than the one that has just been self-locked. This prevents the operator at any other station from making a call even though his switch S is held operated, and he must therefore wait until the channel is idle again, his busy relay $R_3$ is released, and his contactor arm CA again reaches its contact C.

It is to be understood that the above-described arrangement is illustrative of the principles of the invention. Other arrangements may be devised by those skilled in the art without departing from the spirit and scope of the invention.

What is claimed is:

1. A system for preventing interference due to simultaneous operation of a plurality of radio transmitters all operating on the same frequency and associated with different stations of a common radio system comprising at each station a monitor receiver for waves emitted by any of said transmitters, a primary control circuit for energizing the transmitter at that station, means responsive to the output of the monitor receiver for disabling said primary control circuit only when the associated transmitter is idle, and an auxiliary control circuit interconnecting all stations of said system including at each station a periodically operating switch, the switch at each station being adjusted to operate at a different time and being effective in the absence of output from said monitor receiver periodically to complete the primary control circuits for the respective transmitters in predetermined order.

2. Apparatus for preventing interference due to simultaneous operation of a plurality of radio transmitters all operating on the same frequency and associated with different stations of a common radio system comprising at each station a monitor receiver for waves emitted by any of said transmitters, a primary control circuit for energizing the transmitter at that station, means responsive to the output of the monitor receiver for disabling said primary control circuit, a locking circuit for by-passing said disabling means to permit continued energization of the transmitter which is in operation despite the action of its associated monitor receiver controlled circuit, and auxiliary circuit including a periodically operating switch at each station, means operative upon said primary control circuit at that station in the absence of output from said monitor receiver, the operating times of each of said switches being adjusted with reference to those at the other stations to permit energization of said transmitters in predetermined order.

3. In a system employing a plurality of radio stations each having a transmitter adjusted for emitting waves of the same frequency, a control circuit at each station comprising a power supply for the respective transmitter and a first relay having contacts for controlling the connection of said power supply to said transmitter, a monitor receiver at each station for waves emitted by any of said transmitters, a second relay associated with each receiver and operable in response to such waves, an asssignment switch at each station, means responsive to said assignment switch for energizing the first relay at that station including in series a source of potential, the winding of said first relay, a pair of time operated contacts, the operated contacts of said assignment switch, and an unoperated contact of said second relay, means for recurrently closing said pair of contacts at each station, the recurrence period being the same for all transmitters and each pair of contacts being closed at a different time from the others, and a locking circuit for maintaining each first relay operated independently of the action of said time operated contacts comprising said source, the winding of said first relay, an operated contact of said first relay and an operated contact of said assignment switch.

4. In a system employing a plurality of radio stations each having a transmitter adjusted for emitting waves of the same frequency, a control circuit at each station comprising a source of power for the respective transmitter and a first relay having contacts for controlling connection of said source to each transmitter, a monitor receiver at each station for receiving waves emitted by any transmitter, a second relay operated by each receiver in response to such waves, a rotating contactor at each station making a single contact per revolution, means for driving said contactors so as to make their respective contacts in an assigned sequence, an assignment switch at each station, means responsive to said assignment switch for energizing the first relay comprising a circuit including the unoperated contacts of said second relay, an operated contact of said assignment switch, the contacts of the rotating contactor at the station, the winding of said first relay, and a second source of power, the operation of said second relay in response to the output of the monitor receiver disabling said circuit, and an auxiliary control circuit for locking said first relay independently of the action of said contactor including said second source of power, the winding of said first relay, an operated contact of said first relay and an operated contact of said assignment switch.

LOUIS A. DORFF.

References Cited in the file of this patent

UNITED STATES PATENTS

| Number | Name | Date |
|---|---|---|
| 2,165,062 | MacKay | July 4, 1939 |
| 2,248,746 | Davis | July 8, 1941 |
| 2,433,281 | Lord | Dec. 23, 1947 |
| 2,436,824 | Potter | Mar. 2, 1948 |
| 2,490,061 | Jensen et al. | Dec. 6, 1949 |